Figure 1:
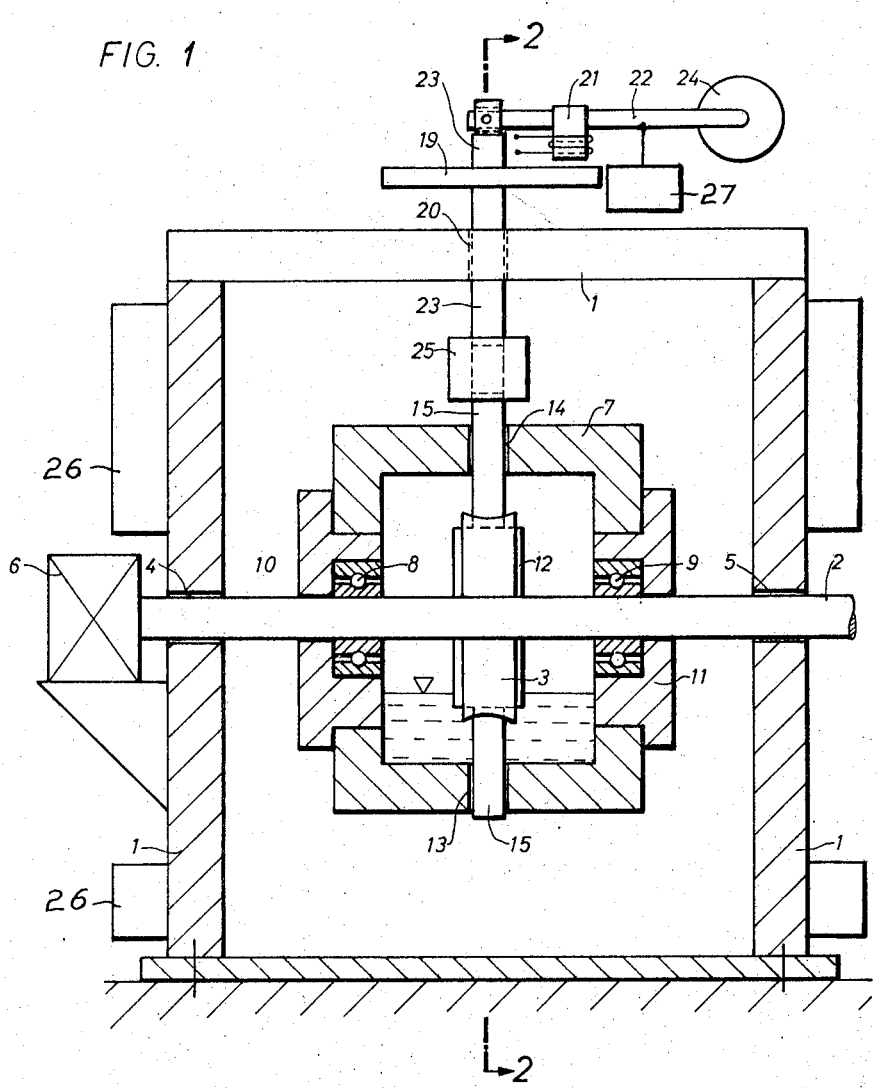

Nov. 21, 1967   W. LOHMAR ETAL   3,353,398
METHOD AND APPARATUS FOR TESTING THE
LUBRICATION BEHAVIOUR OF LUBRICANTS
Filed July 20, 1964   2 Sheets-Sheet 1

INVENTORS:
WALTHER LOHMAR, HANS-JOACHIM HARNISCH, JOSEF SCHMAHL, ORTWIN KÖHLI,
ANTON SPENNER.
BY
ATTORNEY

United States Patent Office 3,353,398
Patented Nov. 21, 1967

3,353,398
METHOD AND APPARATUS FOR TESTING THE LUBRICATION BEHAVIOUR OF LUBRICANTS
Walther Lohmar, Leverkusen, Hans Joachim Harnisch, Leverkusen-Bayerwerk, Josef Schmahl and Ortwin Köhli, Leverkusen, and Anton Spenner, Opladen, Germany, assignors to Farbenfabriken Bayer Aktiengesellschaft, Leverkusen, Germany, a corporation of Germany
Filed July 20, 1964, Ser. No. 383,895
Claims priority, application Germany, July 24, 1963, F 40,334
6 Claims. (Cl. 73—10)

This invention relates to a method of testing the lubrication behaviour of lubricants in sliding friction, using gear wherein the input and output power are measured, and an apparatus for carrying the method into effect.

The object of the invention is to provide an accurate testing method for lubrication behaviour under conditions close to those found in practice, wear or destruction of the testing apparatus being avoided.

This object is achieved by bringing the lubricant into the gliding plane of a worm gear driven by a worm wheel.

As a result of the drive taking place from the worm wheel side, such high engagement forces are reached that the normal bearing friction of the gear can be disregarded.

In worm gears having a driving worm, it is known that the following equation applies for the efficiency $\eta$:

$$\eta = \frac{\tan \gamma_m}{\tan (\gamma_m + s)}$$

wherein $\gamma_m$ represents the mean pitch angle of the worm and $s$ represents $\tan^{-1} \mu$ ($\mu$=coefficient of friction).

With worm gears driven through the worm wheel, there is a heavy wastage of the reacting forces and the efficiency in this case is:

$$\eta' = \frac{\tan (\gamma_m - s)}{\tan \gamma_m}$$

By comparing worms which have different mean pitch angles $\gamma_m$ it is possible using this measuring principle to differentiate between lubricants even with those lubricants which show only slight differences in lubrication properties.

Furthermore, since the efficiency in worm gears decreases as the transmission ratio becomes higher, it is advantageous to have a high transmission ratio, in the worm gear according to the invention, for example, a ratio between 20 and 50. With coefficients of friction between $\mu$=0.1 and $\mu$=0.01, as found with conventional lubricated surfaces, then it follows from the condition $\gamma_m \geq s$ that $\gamma_m \approx 6°$ in this case. The coefficient of friction must therefore be suitably chosen for the various ranges to be investigated.

The apparatus according to the invention comprises a worm gear, which is arranged in a housing which can be heated containing the substance to be tested, wherein the housing is oscillatably mounted on a horizontal worm wheel shaft provided with a drive means and is provided with a lever arm for measuring torque, and wherein a vertical shaft of a worm driven by the worm wheel is mounted in the housing and is connected by an elastic coupling to an eddy current brake fixedly arranged outside the housing, which brake is provided with an adjustable braking magnet fixed on an oscillatably mounted lever arm connected to a torque measuring device.

In order to change the meshing conditions between the worm wheel and worm, the housing is mounted on the worm wheel shaft in eccentric brushes, wherein the eccentricities are adjustable independently of one another. Since the meshing conditions can be adjusted the inaccuracies which are unavoidable due to the methods of fixing are compensated for with the wheel sets used, so that these inaccuracies have no effect on the result of the test.

The housing is adapted to be heated and any desired temperatures for the housing and lubricant can be obtained by a thermostatically controlled heating arrangement. The quantity of lubricant necessary for a test is at least approximately 250 cc. The input and output power, the driving speed and the oil temperature are measured, so that by choosing the corresponding independent variables and parameters, it is possible to plot; power loss, input power, output power, worm wheel torque, worm torque, speed of rotation, sliding speed and oil temperature.

By using different wheel sets, it is in addition possible to investigate the influence of the pairing of the materials used, the surface qualities, etc., on the lubricating behaviour of a lubricant.

Figure 2:
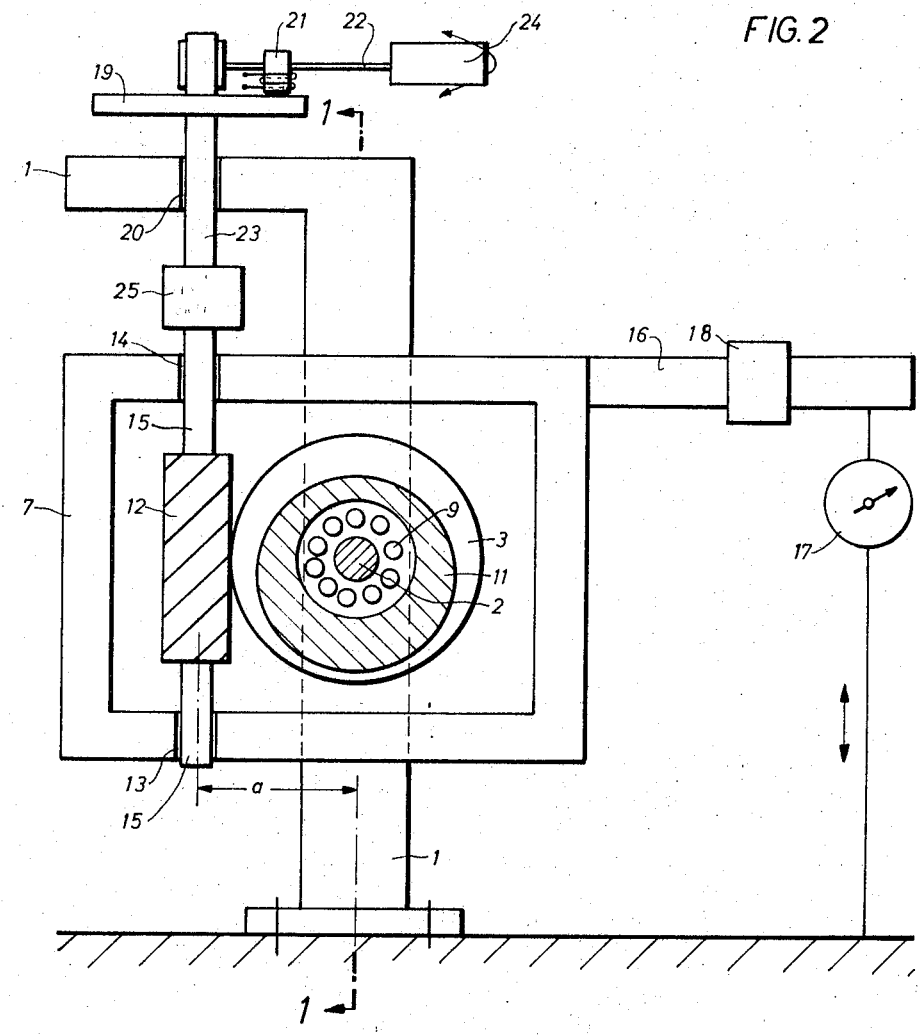

One embodiment of the measuring arrangement is shown diagrammatically and by way of example in the accompanying drawing, FIG. 1 being a longitudinal section and FIG. 2 a cross-section on the line 2—2.

The shaft 2 of the worm wheel 3 is mounted in the bearings 4 and 5 in the fixed machine frame 1. The shaft 2 and worm wheel 3 are set in rotation by a motor 6, the rotation speed of which can be selectively varied over a continuous speed range. The housing 7 of the worm gear is oscillatably mounted on the shaft 2 in eccentric bushings 10 and 11 provided with ball bearings 8 and 9. The worm 12 (see also FIG. 2) is mounted in the bearings 13 and 14 in the housing 7. By adjustment of the eccentric bushings 10 and 11, the spacing $a$ (FIG. 2) between the worm shaft 15 mounted in the housing and the worm wheel shaft 2 which carries the housing itself can be varied, as the meshing ratio between worm and worm wheel is altered.

Fixed on the housing 7 is a lever arm 16 (FIG. 2), the free end of which is connected to a torque measuring device 17. The test gears 3 and 12 are counterbalanced in the horizontal plane by the weight 18 which is displaceable on the lever arm 16.

An apertured brake disc 19 of an eddy current brake is mounted in a bearing 20 in the machine frame 1.

The brake magnet 21 is arranged on a lever arm 22, which is mounted so as to oscillate about the shaft 23 of the brake disc 19 and is connected at its free end to a torque measuring device, 24. The worm shaft is connected to the brake disc shaft 23 by means of an elastic coupling 25.

Heating means 26 is shown in FIG. 1, adapted to regulate the temperature of the testing device hereof. Rotational speed measuring means 27 is shown in FIG. 1, adapted to measure the rotational speed of the worm.

The speed of rotation of the worm is established photoelectrically using the apertured brake disc 19. This speed of rotation, the input torque and the output torque and also the temperature of the lubricant and housing, are measured.

We claim:
1. A method of testing the lubricating characteristics of a lubricant, which comprises introducing a liquid lubricant between a worm wheel and meshing worm therefor; driving said worm with said worm wheel, measuring the torques acting upon each worm element and measuring the rotation speeds thereof to determine the effective sliding friction between said gear elements under lubrication as indicated by their individual measured torques and rotation speeds.

2. The method according to claim 1 including the step of heating the lubricant within the housing to a predetermined temperature to determine the effective sliding friction between said gear elements under lubrication at such temperature, as indicated by the measured torques and rotation speeds of said gear elements.

3. An apparatus for testing the lubricating characteristics of a lubricant, which comprises a housing disposed to hold a quantity of liquid lubricant to be tested, a worm wheel disposed within said housing for rotation relative thereto about a generally horizontal axis, a worm disposed within said housing for rotation relative thereto and disposed in meshing engagement with said worm wheel to be rotatably driven thereby, said worm wheel being positioned within said housing to contact the liquid lubricant therein and to continuously convey such lubricant by its rotary movement into the regions of the worm wheel and worm in mutual meshing engagement to reduce the sliding friction therebetween, a variable speed drive means extending into said housing and connected to said worm wheel to drive same at a selected rotation speed, means coupled to said worm wheel to measure the torque acting thereupon, means coupled to said worm to measure the rotation speed thereof, and means coupled to said worm to measure the torque acting thereupon, whereby the effective sliding friction between said worm and worm wheel under lubrication can be determined from the torques acting thereupon as indicated by their respectively associated torque measuring means, and from their individual rotation speeds as indicated by the speed measuring means for the worm, and as established by said variable speed drive means for the worm wheel.

4. The apparatus according to claim 3 including heater means disposed for heating the liquid lubricant within said housing to accommodate testing of sliding friction between the worm and worm wheel under lubrication at temperatures established by said heater means.

5. The apparatus according to claim 3 including a frame, and a drive shaft associated with said variable speed drive means and supported by said frame for rotation relative thereto, said drive shaft being connected to said worm wheel through said housing to rotatably drive said worm wheel and disposed through journal bearings carried by said housing to support same suspended from the frame.

6. The apparatus according to claim 5 wherein said drive shaft journal bearings are supported by bushings eccentrically adjustable with respect to said housing to correspondingly adjust the degree of meshing engagement between said worm wheel and worm.

References Cited
UNITED STATES PATENTS

| | | | |
|---|---|---|---|
| 1,482,706 | 2/1924 | Short | 73—162 |
| 2,033,588 | 3/1936 | Pigott et al. | 73—10 |
| 2,132,347 | 10/1938 | Anderson | 73—10 |
| 2,867,114 | 1/1959 | Mims | 73—9 |

DAVID SCHONBERG, *Primary Examiner.*